US011204248B2

(12) United States Patent
Parodi

(10) Patent No.: US 11,204,248 B2
(45) Date of Patent: *Dec. 21, 2021

(54) NAVIGATING USING ELECTROMAGNETIC SIGNALS

(71) Applicant: Amazon Technologies, Inc., Seattle, WA (US)

(72) Inventor: Carlos Guillermo Parodi, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 201 days.

This patent is subject to a terminal disclaimer.

(21) Appl. No.: 16/507,384

(22) Filed: Jul. 10, 2019

(65) Prior Publication Data

US 2019/0346270 A1   Nov. 14, 2019

Related U.S. Application Data

(63) Continuation of application No. 15/601,602, filed on May 22, 2017, now Pat. No. 10,378,902.

(51) Int. Cl.
*G01C 21/16* (2006.01)
*G01S 19/46* (2010.01)
(Continued)

(52) U.S. Cl.
CPC .......... *G01C 21/165* (2013.01); *G01S 5/0226* (2013.01); *G01S 5/08* (2013.01);
(Continued)

(58) Field of Classification Search
CPC ......... G01C 21/165; G01S 5/08; G01S 19/48; G01S 19/46; G01S 19/47; G01S 5/0226; G05D 1/101
See application file for complete search history.

(56) References Cited

U.S. PATENT DOCUMENTS

| 6,590,834 | B1  | 7/2003 | Highfill |
|-----------|-----|--------|---------|
| 2005/0021178 | A1* | 1/2005 | Kim .......................... G01S 5/00 700/245 |

(Continued)

OTHER PUBLICATIONS

Final Office Action dated Jan. 14, 2019 in U.S. Appl. No. 15/601,602, "Navigating Using Electromagnetic Signals," Parodi, 19 pages.

(Continued)

*Primary Examiner* — Rami Khatib
(74) *Attorney, Agent, or Firm* — Lee & Hayes, P.C.

(57) ABSTRACT

A system to determine position and/or heading may include a receiver including at least two antennas configured to be coupled to the vehicle and receive electromagnetic signals including at least one of microwaves or radio waves. The system may also include a navigation module configured to determine first and second locations associated with respective first and second transmitters that send respective first and second signals. The navigation module may also be configured to determine, based at least in part on the first signals, a first relative orientation of the receiver relative to the first transmitter, and determine, based at least in part on the second signals, a second relative orientation of the receiver relative to the second transmitter. The navigation module may also be configured to determine a position and/or heading of the vehicle based at least in part on the first and second relative orientations of the receiver.

20 Claims, 7 Drawing Sheets

(51) Int. Cl.
  *G01S 19/47* (2010.01)
  *G01S 5/02* (2010.01)
  *G05D 1/10* (2006.01)
  *G01S 5/08* (2006.01)
  *G01S 19/48* (2010.01)

(52) U.S. Cl.
  CPC .............. *G01S 19/46* (2013.01); *G01S 19/47* (2013.01); *G01S 19/48* (2013.01); *G05D 1/101* (2013.01)

(56) References Cited

U.S. PATENT DOCUMENTS

| | | |
|---|---|---|
| 2012/0326923 A1 | 12/2012 | Oehler et al. |
| 2016/0170030 A1 | 6/2016 | Dolgin et al. |
| 2017/0329351 A1 | 11/2017 | Park et al. |
| 2017/0352941 A1 | 12/2017 | Peitzer et al. |
| 2018/0024555 A1 | 1/2018 | Parks et al. |

OTHER PUBLICATIONS

Non-final Office Action dated Aug. 13, 2018 in U.S. Appl. No. 15/601,602, "Navigating Using Electromagnetic Signals," Parodi, 18 pages.

* cited by examiner

NAVIGATING USING ELECTROMAGNETIC SIGNALS

CROSS REFERENCE TO RELATED APPLICATIONS

This application is a continuation and claims the benefit of priority based on U.S. patent application Ser. No. 15/601,602, filed May 22, 2017, the disclosure of which is incorporated herein by reference.

BACKGROUND

Several types of systems may be used for navigation including global positioning systems (GPS) and inertial navigation systems (INS). However, both GPS and INS may suffer from inaccuracies or unreliability when used under certain conditions. For example, some less sophisticated GPS receivers may be less accurate than desired due, for example, to signal noise, or may be unavailable when signals from GPS satellites are blocked by structures, such as buildings and tunnels, or when signals are intentionally blocked. INS may suffer from inaccuracies due to drift, which are accumulated inaccuracies in the position determination that increase over time. As a result, INS requires frequent supplementation from another form of navigation system to reset the positon determination. As a result, GPS and INS may not be sufficiently accurate or reliable for some implementations.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
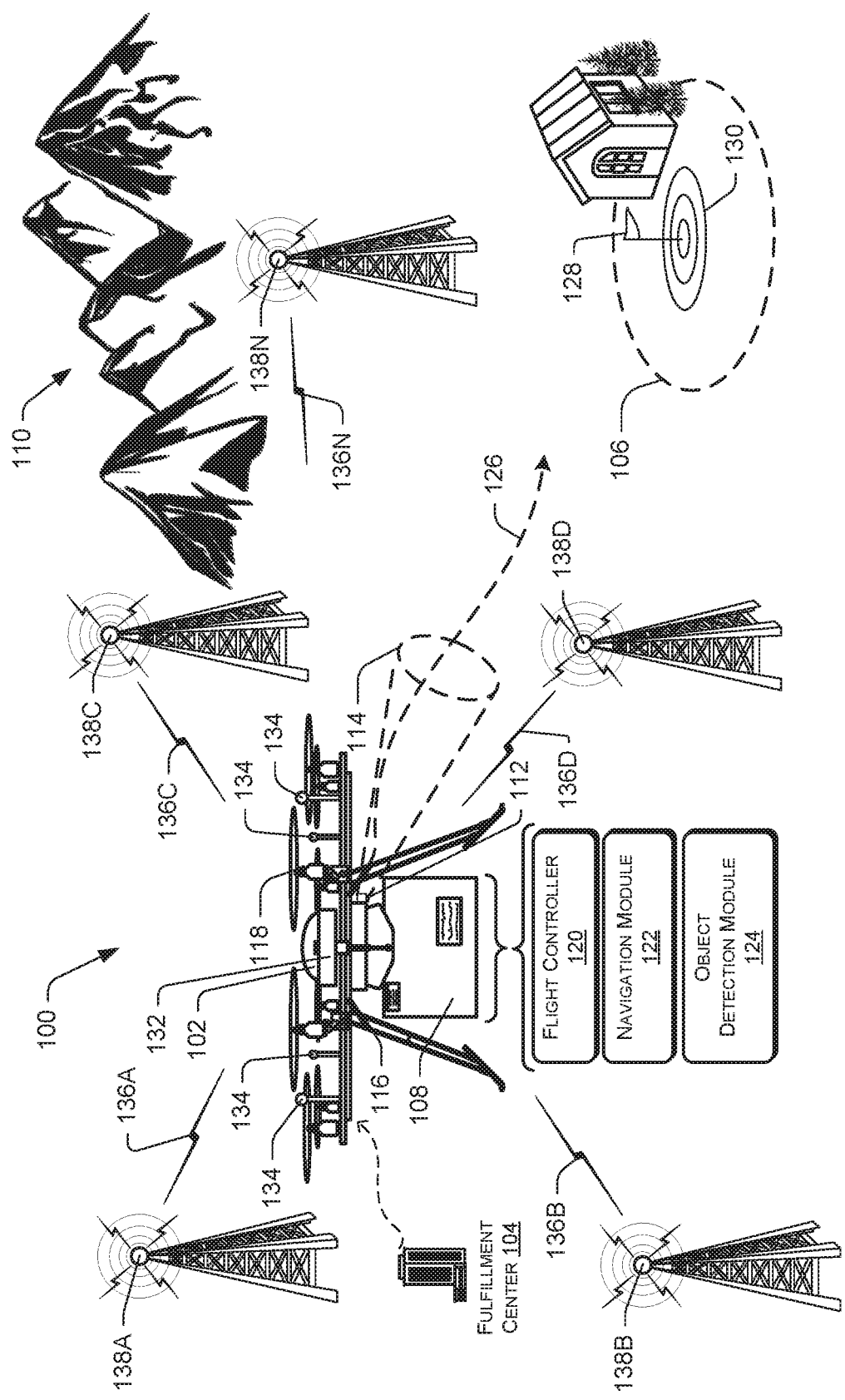
FIG. 1 is a schematic diagram of an illustrative environment that includes an unmanned aerial vehicle (UAV) configured to receive electromagnetic signals for navigation.

This disclosure is generally directed to a system that uses electromagnetic signals for determining position, which may be used for navigating a vehicle, such as a UAV. The electromagnetic signals may include any electromagnetic radiation signals, such as, for example, radio wave signals and microwave signals. Such signals may be transmitted by signal sources, such as, for example, amplitude modulation (AM) and/or frequency modulation (FM) radio stations, television stations, cellular telephone stations, mobile telephone stations, and Wi-Fi transmitters (e.g., amplified Wi-Fi transmitters).

The system may include a receiver including at least two antennas coupled to the vehicle in a spaced relationship with respect to one another and receive electromagnetic signals including at least one of microwaves or radio waves. The system may also include a navigation module to determine a first location associated with a first transmitter that sends first signals and a second location associated with a second transmitter that sends second signals. In some examples, the locations of one or more of the first and second transmitters may be determined from a database, obtained from other sources, or calculated based on other information. The navigation module may also receive the first signals from the first transmitter and determine a first relative orientation of the receiver relative to the first transmitter. The navigation module may receive the second signals from the second transmitter and determine a second relative orientation of the receiver relative to the second transmitter. The navigation module may determine a position of the vehicle based on the first relative orientation and the second relative orientation of the receiver. In some examples, the navigation module may determine the position of the vehicle based on the first location of the first transmitter and the second location of the second transmitter. When associated with a vehicle, the position may be represented by the north east down (NED) position of the vehicle, where the NED position is represented by three coordinate values corresponding respectively to the vehicle position along the northern axis, the vehicle position along the eastern axis, and the vehicle position along the vertical axis. As used herein, the position may refer to one or more of the three vehicle axis positions. Some examples of the system may be able to determine position as represented by two of the three coordinate values, such as, for example, along the northern axis and the eastern axis, and another system (e.g., a pressure transducer or altimeter) may be used to determine the vehicle position with respect to the third axis (e.g., along the vertical axis). In some examples, the navigation module may be configured to determine a heading of the vehicle based at least in part on the first and second orientations and the first and second locations of the first and second transmitters. This may avoid reliance on a magnetic compass to determine heading, which may be desirable when use of a magnetic compass would be inaccurate.

The navigation module may be configured to determine a first virtual line extending between the first transmitter and the receiver, and determine a second virtual line extending between the second transmitter and the receiver. Using these virtual lines, the navigation module may be configured to determine the position and/or heading of the receiver based at least in part on a location at which the first and second virtual lines intersect.

Some examples of the system may improve the accuracy and/or the reliability of the position and/or heading determination of the vehicle, for example, as compared to a system that includes only a conventional GPS and/or a conventional INS. For example, noise in the GPS satellite signals may induce inaccuracies in the position determined solely via the GPS, and the system according to some examples may be used to augment or supplement the GPS determination and thereby improve its accuracy. In addition, the system according to some examples may provide the position and/or heading determination when GPS is unavailable, for example, when structures block the GPS satellite signals or when the GPS satellite signals are being jammed. Further, the system may be used to determine an updated position and provide an INS with the updated position from which to determine relative motion using the INS. This may improve the accuracy of the position determination by mitigating undesired drift of the position determination provided by the INS.

According to some examples, the system may provide a position and/or heading determination by using electromagnetic signals received from, for example, radio stations, television stations, cellular telephone stations, mobile telephone stations, and/or Wi-Fi transmitters (e.g., amplified Wi-Fi transmitters) within signal range of the receiver. This may be particularly useful when the system is used in geographic areas having a number of such signal sources within range at any given time. Because these signal sources are already transmitting signals for other purposes, they may provide a convenient and inexpensive way to determine the position and/or heading of the receiver and/or any device coupled to the receiver, such as for example, a vehicle such as a UAV.

In some examples of the system, the navigation module may be configured to determine a third location associated with a third transmitter that transmits third signals, and determine a fourth location associated with a fourth transmitter that transmits fourth signals. The navigation module may be configured to receive the third signals from the third transmitter and determine, based at least in part on the third signals, a third relative orientation of the receiver relative to the third transmitter. The navigation module may also be configured to receive the fourth signals from the fourth transmitter and, based at least in part on the fourth signals, a fourth relative orientation of the receiver relative to the fourth transmitter. The navigation module may be configured to determine the position and/or heading of the vehicle based at least in part on the first, second, third, and fourth orientations and the first, second, third, and fourth locations of the transmitters. By using more signals from more signal sources, the navigation module may be able to improve the accuracy of its position and/or heading determinations. Some examples of the navigation module may be configured to determine a third virtual line extending between the third transmitter and the receiver, and determine a fourth virtual line extending between the fourth transmitter and the receiver. Using these virtual lines, the navigation module may be configured to determine the position and/or heading of the receiver based at least in part on the location at which the first and second virtual lines intersect and the location at which the third and fourth virtual lines intersect.

The system may in some examples determine at least one of first location data associated with the first transmitter or second location data associated with the second transmitter by receiving at least one of the first signals or the second signals, determining a frequency of at least one of the first signals or the second signals, and determining at least one of the first location data or the second location data based at least in part on the frequencies. The location data may include the location of the corresponding signal sources. In some examples, determining at least one of the first location data or the second location data based at least in part on the frequency may include receiving at least one of the first location data or the second location data from a database including signal source frequencies and corresponding signal source locations.

In some examples of the system, the navigation module may be configured to receive third signals from a third transmitter at a first position of the receiver, and receive third signals from the third transmitter at a second position of the receiver. Using these signals, the navigation module may be configured to determine the location of the third transmitter based at least in part on the first and second positions of the receiver and the third signals. For example, the navigation module may be configured to determine a third position and/or heading of the receiver based at least in part on third signals received from the third transmitter and at least one of the first signals received from the first transmitter or the second signals received from the second transmitter, for example, as explained herein. This may provide the system with the ability to continue determining position and/or heading as the receiver travels out of range of some signal sources and into range of other signal sources. In this example manner, the system may be able to continue determining position and/or heading, so long as at least two signal sources are within range, for example, as explained herein.

The navigation module may also, in some examples, be configured to access a database including signal source frequencies and corresponding signal source locations, and search for signal source frequencies from the database via the receiver that are limited to frequencies within a threshold range of the location of the receiver. This may reduce the complexity of operation, result in more efficient use of computational resources, and/or increase the responsiveness of the system. For example, by limiting the number of possible signal sources to those within range, the navigation module may more quickly identify the signal sources and their respective location data by not considering every possible signal source in the database.

The system in some examples may also be used in combination with other types of navigation systems, for example, to augment, supplement, and/or increase the reliability and/or accuracy of the other navigation systems. For example, a first position and/or first heading of the receiver may be determined via at least one of a GPS, an INS, or an image-based navigation system. Thereafter, a second position and/or heading of the receiver may be determined based at least in part on the first and second orientations and the first and second location data determined via the system. The second position and/or heading determined by the system may be used when the GPS determination is inaccurate or unavailable, to reduce drift of the INS determination, and/or when image-based navigation is unavailable due, for example, to clouds, fog, and/or other image obstructions.

The techniques and systems described herein may be implemented in a number of ways. Example implementations are provided below with reference to the following figures.

FIG. 1 is a schematic diagram of an illustrative environment 100 that includes a UAV 102 configured to travel through the environment 100. The example environment 100 includes a fulfillment center 104 where the UAV 102 may originate a flight directed to a destination 106, such as a location associated with a recipient of a package 108 transported by the UAV 102. The example environment 100 shown in FIG. 1 includes terrain 110, which may include various features, such as mountains, trees, buildings, bridges, telephone poles and wires, and electrical power towers and power wires.

The UAV 102 may be equipped with one or more cameras 112 providing a field of view 114, which may be used for guidance and/or navigation. For example, the camera(s) 112 may enable detection of obstacles to avoid, detect an objective marker, assist with navigation, and/or for other reasons. The UAV 102 may, at times, conduct autonomous flight using information captured by the camera(s) 112.

The UAV 102 may be equipped with a number of components to enable the UAV 102 to perform operations during the delivery of the package 108. For example, the UAV 102 may include a frame 116 and a propulsion system 118 coupled to the frame 116 and configured to propel the UAV 102 through the environment 100. The components may also include a flight controller 120, a navigation module 122, and an object detection module 124, as well as other components discussed below with reference to FIGS. 2-5. For example, the UAV 102 may travel under control of the flight controller 120 and along the flight path 126 toward the destination 106. The flight controller 120 may receive data from the navigation module 122 to assist the flight controller 120 with following the flight path 126 to arrive at the destination 106. The flight controller 120 may continually, or from time to time, provide controls to cause change in a velocity of the UAV 102, a change in heading, a change in altitude, a change in orientation, and/or other changes (e.g., pitch, roll, yaw, hover, etc.), for example, based at least in part on data received from the navigation module 122. In addition, the UAV 102 may execute different controls based on different flight scenarios, such as a takeoff stage, a transport stage, a package deposit stage, and/or a landing stage of flight.

The object detection module 124 may identify objects in imagery captured by the camera(s) 112, which may be used to inform the flight controller 120, and for other reasons, such as to provide communications to the object or to a central command, etc. For example, the object detection module 124 may identify objective markers 128 via analysis of imagery captured by the camera(s) 112. The objective markers 128 may be associated with a waypoint, a drop zone 130 for the destination 106, and/or associated with other locations.

The navigation module 122 of UAV 102 may include a receiver 132 including at least two antennas 134 (e.g., three or four antennas 134) configured to received electromagnetic signals 136 from a number of signal sources 138. The receiver 132 may be configured to receive the respective electromagnetic signals 136A, 136B, 136C, 136D . . . 136N from the respective signal sources 138A, 138B, 138C, 138D, . . . 138N, and the navigation module 122 may determine the position of the receiver 132 (and the UAV 102) based on the respective relative orientations of the receiver 132 relative to the respective signal sources 138, for example, as explained in more detail herein. For example, the receiver 132 may use electromagnetic signals 136 from two or more respective signal sources 138 to determine the position and/or heading of the receiver 132, and thus, the position and/or heading of the UAV 102.

Figure 2:
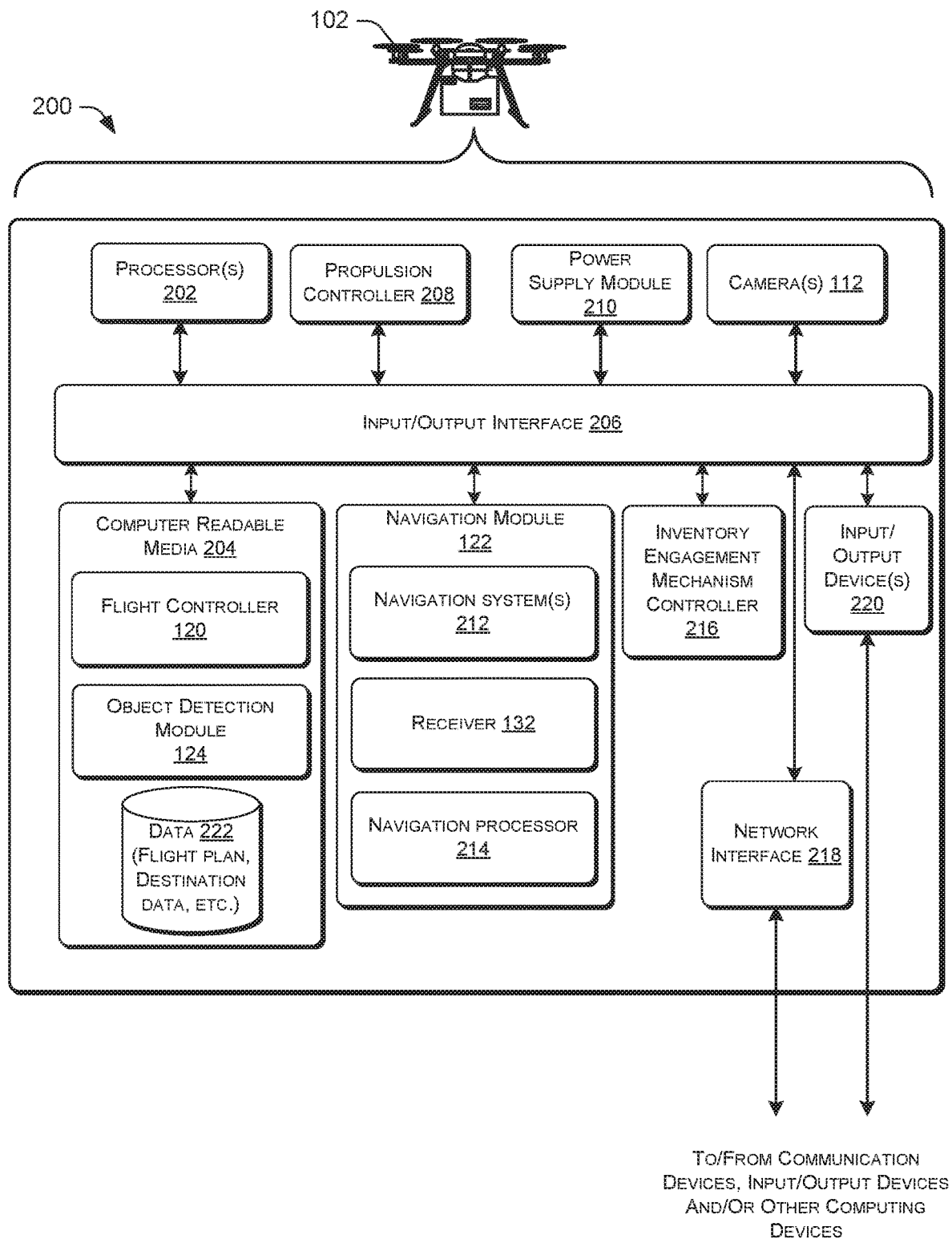
FIG. 2 is a block diagram of an illustrative UAV architecture of the UAV shown in FIG. 1.

FIG. 2 is a block diagram of an illustrative UAV architecture 200 of the UAV 102. The UAV architecture 200 may be used to implement the various systems, devices, and techniques discussed above. In the illustrated implementation, the UAV architecture 200 includes one or more processors 202, coupled to a non-transitory computer readable media 204 via an input/output (I/O) interface 206. The UAV architecture 200 may also include a propulsion controller 208, a power supply module 210, and/or the navigation module 122. The navigation module 122 may include one or more navigation systems 212, such as, for example, a GPS and/or an INS to assist with determining the position and/or heading of the UAV 102. In some examples, the navigation systems 212 may include a system for determining the altitude of the UAV 102, such as, for example, a pressure transducer and/or altimeter. Other navigation systems are contemplated. The example navigation module 122 also includes the receiver 132 and a navigation processor 214 configured to determine the position and/or heading of the receiver 132 (and the UAV 102) using electromagnetic signals 136 from signal sources 138, as explained in more detail with respect to FIGS. 3-5. The example UAV architecture 200 further includes an inventory engagement mechanism controller 216 to interact with the package 108, the camera(s) 112, a network interface 218, and one or more input/output (I/O) devices 220.

In various implementations, the UAV architecture 200 may be implemented using a uniprocessor system including one processor 202, or a multiprocessor system including several processors 202 (e.g., two, four, eight, or another suitable number). The processor(s) 202 may be any suitable processor capable of executing instructions. For example, in various implementations, the processor(s) 202 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 202 may commonly, but not necessarily, implement the same ISA.

The non-transitory computer readable media 204 may be configured to store executable instructions/modules, data, flight paths, and/or data items accessible by the processor(s) 202. In various implementations, the non-transitory computer readable media 204 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable memory. In other implementations, program instructions, data and/or flight paths may be received, sent or stored upon different types of computer-accessible media, such as non-transitory media, or on similar media separate from the non-transitory computer readable media 204 or the UAV architecture 200. Generally speaking, a non-transitory, computer readable memory may include storage media or memory media such as flash memory (e.g., solid state memory), magnetic or optical media (e.g., disk) coupled to the UAV architecture 200 via the I/O interface 206. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via the network interface 218.

In some implementations, the I/O interface 206 may be configured to coordinate I/O traffic between the processor(s) 202, the non-transitory computer readable media 204, and any peripheral devices, the network interface 218 or other peripheral interfaces, such as input/output devices 220. In some implementations, the I/O interface 206 may perform any necessary protocol, timing or other data transformations to convert data signals from one component (e.g., non-transitory computer readable media 204) into a format suitable for use by another component (e.g., processor(s) 202). In some implementations, the I/O interface 206 may include support for devices attached through various types of peripheral buses, such as, for example, a variant of the Peripheral Component Interconnect (PCI) bus standard or the Universal Serial Bus (USB) standard. In some implementations, the function of the I/O interface 206 may be split into two or more separate components, such as, for example, a north bridge and a south bridge. Also, in some implementations, some or all of the functionality of the I/O interface 206, such as an interface to the non-transitory computer readable media 204 may be incorporated directly into the processor(s) 202.

The propulsion controller 208 may be configured to communicate with the navigation module 122 and/or adjust the power of one or more propulsion devices of the propulsion system 118, such as, for example, propeller motors, to guide the UAV 102 along the flight path 126. The propulsion devices may be any known type of propulsion devices. The power supply module 210 may be configured to control the charging and any switching functions associated with one or more power modules (e.g., batteries) of the UAV 102.

As explained herein, the navigation module 122 may include systems to facilitate navigating the UAV 102 to and/or from a location. The inventory engagement mechanism controller 216 may be configured to communicate with actuator(s) and/or motor(s) (e.g., servo motor(s)) used to engage and/or disengage inventory, such as the package 108. For example, when the UAV 102 is positioned over a surface at a delivery location, the inventory engagement mechanism controller 216 may provide an instruction to a motor that controls the inventory engagement mechanism to release the package 108.

As shown in FIG. 2, the network interface 218 may be configured to allow data to be exchanged between the UAV architecture 200, other devices attached to a network, such as other computer systems, and/or with UAV control systems of other UAVs. For example, the network interface 218 may enable wireless communication between numerous UAVs. In various implementations, the network interface 218 may support communication via wireless general data networks, such as a Wi-Fi network. For example, the network interface 218 may support communication via telecommunications networks such as cellular communication networks, satellite networks, and the like.

The I/O devices 220 may, in some implementations, include sensors such, as accelerometers and/or other I/O devices commonly used in aviation. Multiple I/O devices 220 may be present and controlled by the UAV architecture 200. One or more of the sensors may be utilized to assist in landings as well as avoiding obstacles during flight.

In some embodiments, the computer readable media 204 may store the flight controller 120, the navigation module 122, and the object detection module 124. The components may access and/or write data 222, which may include flight plan data, log data, destination data, image data, and object data, and so forth. The operations of the flight controller 120, the navigation module 122, and the object detection module 124 are described above, and also below by way of various illustrative processes.

In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Those skilled in the art will appreciate that the UAV architecture 200 is merely illustrative and is not intended to limit the scope of the present disclosure. In particular, the computing system and devices may include any combination of hardware or software that can perform the indicated functions, including computers, network devices, internet appliances, PDAs, wireless phones, pagers, etc. The UAV architecture 200 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated UAV architecture 200. Some or all of the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from the UAV architecture 200 may be transmitted to the UAV architecture 200 via transmission media or signals such as electrical, electromagnetic, or digital signals, conveyed via a communication medium such as a wireless link. Various implementations may further include receiving, sending or storing instructions and/or data implemented in accordance with the foregoing description upon a computer-accessible medium. Accordingly, the techniques described herein may be practiced with other UAV control system configurations. Additional information about the operations of the modules of the UAV 102 is discussed below.

Although FIGS. 1, 2, 4, and 5 depict a UAV 102, other vehicles may deploy the navigation module 122 described herein, such as land vehicles (cars, trucks, etc.), marine vehicles (boats, ships, etc.), and/or other types of aircraft. In some examples, the navigation module 122 may be deployed without a vehicle, for example, in a computing device. For example, the navigation module 122 may be deployed in hand-held computing devices and/or wearable computing devices.

Figure 3:
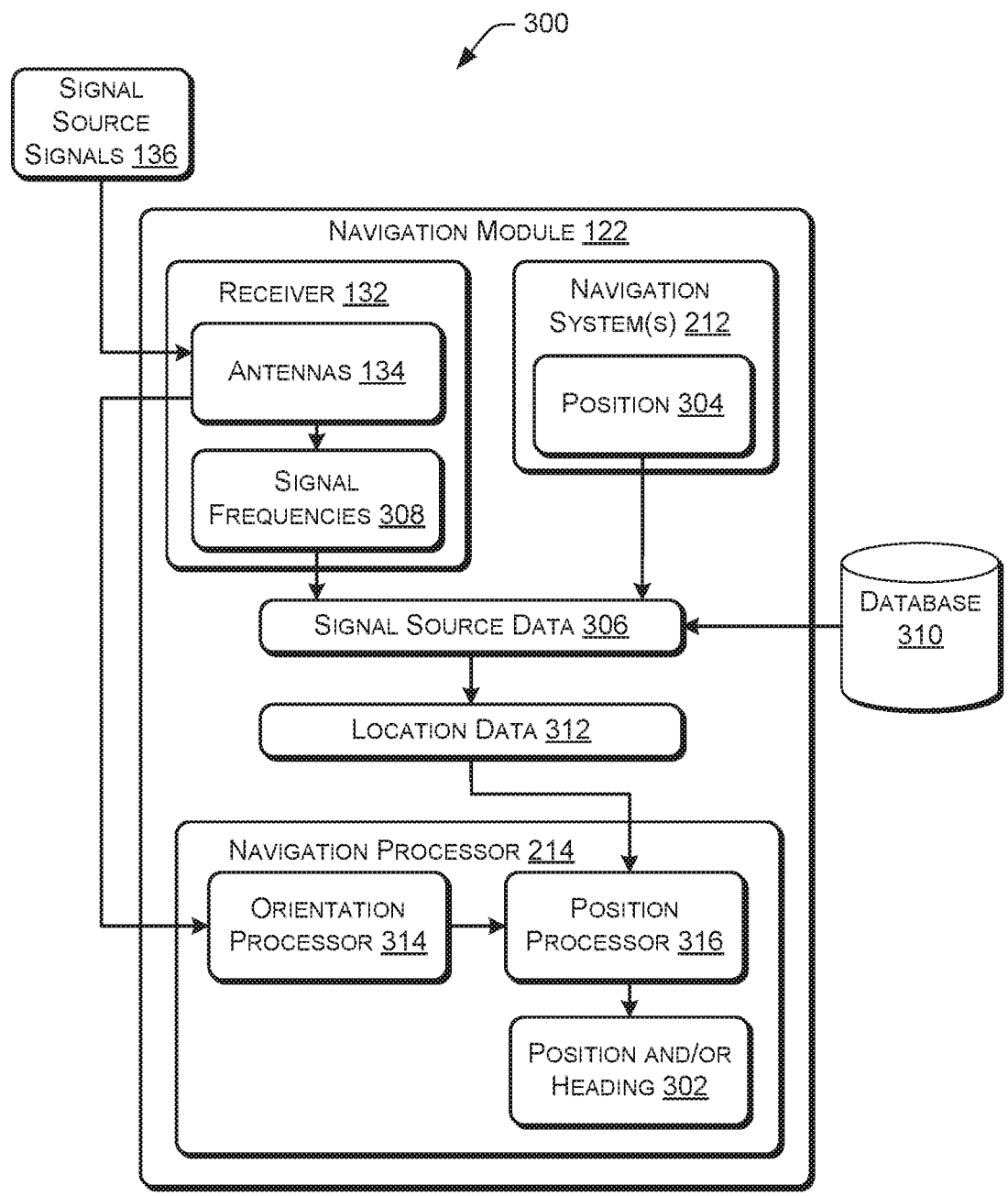
FIG. 3 is a block diagram of an illustrative UAV architecture including an illustrative navigation module including a receiver and a navigation processor for determining position and/or heading.

FIG. 3 is a block diagram of a portion of an illustrative UAV architecture 300 including an illustrative navigation module 122 including a receiver 132 and a navigation processor 214 for determining position and/or heading 302 of the receiver 132, which may be coupled to a UAV 102, thereby providing the position and/or heading 302 of the UAV 102. For example, the receiver 132 may be configured to receive electromagnetic signals 136 from respective signal sources 138 (see FIG. 1) and determine the relative orientations of the receiver 132 relative to the signal sources 138, and based at least in part on those relative orientations, determine the position and/or heading 302 of the receiver 132 (and the UAV 102 to which the receiver 132 is coupled), as explained in more detail with respect to FIGS. 4 and 5.

In the example shown in FIG. 3, the receiver 132 includes antennas 134 configured to receive the electromagnetic signals 136 from the signal sources 138. For example, the antennas 134 may receive electromagnetic signals 136 from two or more signal sources 138. In some examples, the navigation module 122 includes one or more navigation systems 212 configured to determine the position 304 of the receiver 132. For example, the navigation system(s) 212 may include a GPS and/or an INS, and the navigation system(s) 212 may determine an initial position 304 of the receiver 132, which may be used to determine signal source data 306. For example, the receiver 132 may receive the electromagnetic signals 136 and identify the signal frequencies 308 associated with one or more of the received electromagnetic signals 136. In some examples, the electromagnetic signals 136 may be filtered, so that only electromagnetic signals 136 from signal sources 138 having a known location (or of interest) may be evaluated. In some examples, the navigation module 122 may use the position 304 determined by the navigation system(s) 212 and the signal frequencies 308 to determine the signal source data 306. For example, the navigation module 122 may access a database 310 including signal frequencies and corresponding signal source locations, from which the navigation module 122 may be configured to determine the location data 312 associated with one or more of the signal sources 138. For example, the database 310 may include a map of signal sources and their respective transmission frequencies and locations, and the navigation module 122 may be configured to access the database 310 and use the signal frequencies 308 and the position 304 to identify the signal source 138 and its corresponding location data 312. In some examples, the database 310 may be stored in the data 222 (FIG. 2), and in some examples, the database 310 may be stored remotely and accessed via, for example, the network interface 218 (FIG. 2). Although the example shown in FIG. 3 uses navigation system(s) 212 to determine the position 304, in some examples, the navigation module 122 may obtain the position 304 from the navigation processor 214, for example, as explained herein.

In some examples, the location data 312 associated with one or more of the signal sources 138 may include the location of the respective signal source 138. For example, the location data 312 associated with a first signal source 138A and a second signal source 138B (FIG. 1) may include the respective locations of the first and second signal sources 138A and 138B, which may be used by the navigation processor 214 to determine the position and/or heading 302 of the receiver 132 and UAV 102. For example, the navigation processor 214 may receive first signals 136A from the first signal source 138A, and the navigation processor 214 may include an orientation processor 314 configured to determine the relative orientation of the receiver 132 relative to the first signal source 138A, for example, as explained with respect to FIG. 5 herein. The navigation processor 214 may also receive second signals 136B from the second signal source 138B (e.g., spaced from the signal source 138A), and the orientation processor 314 may be configured to determine the relative orientation of the receiver 132 relative to the second signal source 138B. As explained in more detail with respect to FIG. 5, in some examples, the navigation processor 214 may also be configured to determine a first virtual line extending between the signal source 138A and the receiver 132, and determine a second virtual line extending between the second signal source 138B and the receiver 132. In some examples, the navigation processor 214 may include a position processor 316 configured to determine the position and/or heading 302 of the receiver 132 (and the UAV 102) based at least in part on the location at which the first and second virtual lines intersect, and the respective locations of the first and second signal sources 138A and 138B from the location data 312 associated with the first and second signal sources 138A and 138B. By determining the orientation of the receiver 132 relative to the first and second signal sources 138A and 138B and knowing the locations of the first and second signal sources 138A and 138B, the position and/or heading of the receiver 132 may be determined. Although the foregoing has been described by referring to first and second virtual lines for clarity of explanation, some examples of the system may not determine virtual lines.

Figure 4:
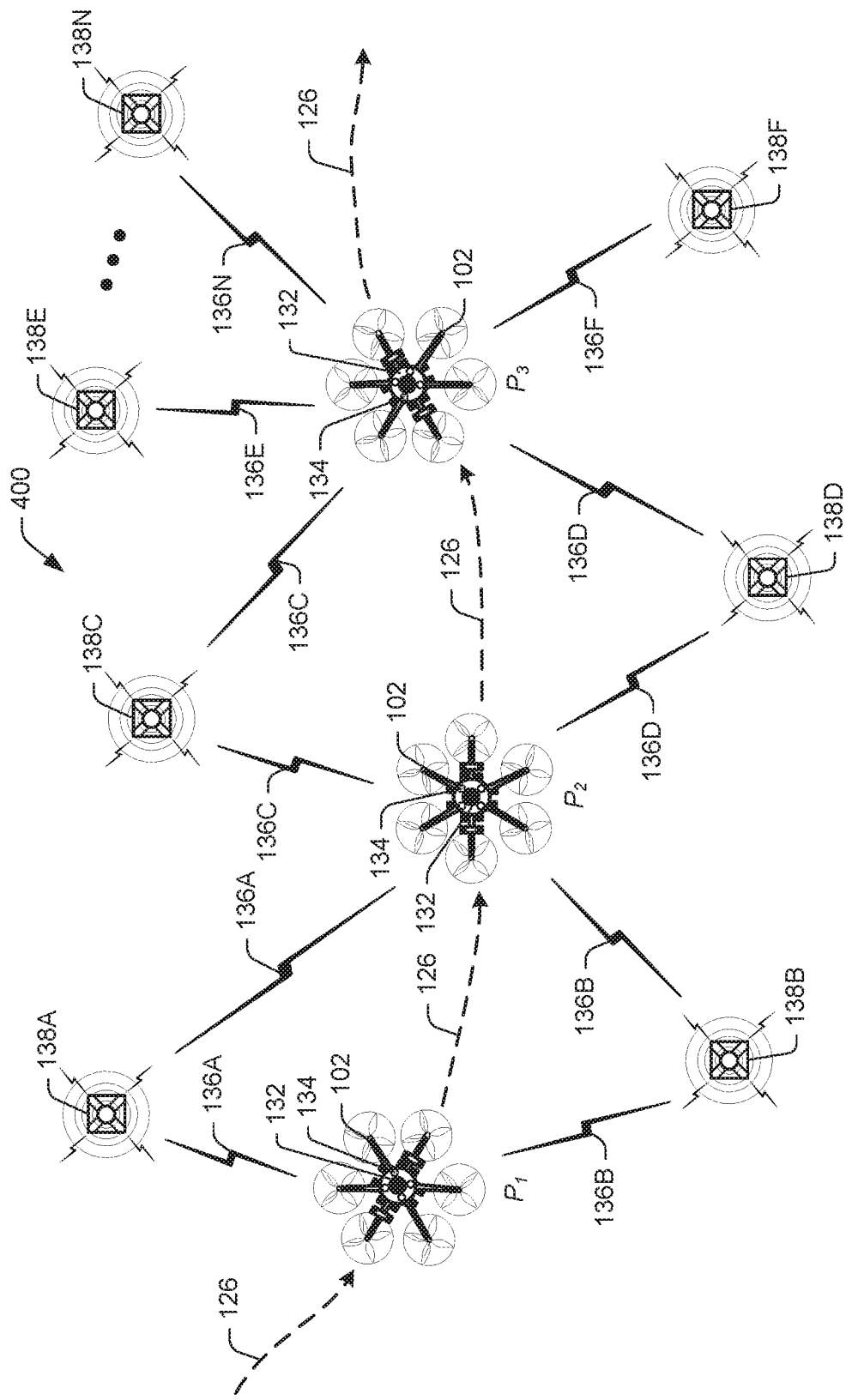
FIG. 4 is a schematic diagram of an illustrative environment that includes electromagnetic signal sources for sending electromagnetic signals that may be used for navigating a UAV.

FIG. 4 is a schematic diagram of an illustrative environment 400 that includes electromagnetic signal sources 138 for sending electromagnetic signals 136 that may be used for navigating an example UAV 102. In the example shown, the UAV 102 travels along a flight path 126, for example, using a flight controller 120 and a navigation module 122 as previously described to navigate and travel along the flight path 126. At position $P_1$, the UAV 102 is within range of the signal sources 138A and 138B, such that the antennas 134 associated with the receiver 132 receive the respective electromagnetic signals 136A and 136B. In some examples, a navigation module 122 (FIGS. 1-3) may use the signals 136A and 136B to determine the position and/or heading of the UAV 102, for example, as described herein. The electromagnetic signals 136A and 136B may include microwaves and/or radio waves.

As shown at position $P_1$, the UAV 102 is not within range of the remaining shown signal sources 138C, 138D, 138E, 138F . . . 138N. However, as the UAV 102 travels to position $P_2$, the UAV 102 is within range of signal sources 138C and 138D, while remaining within range of signal sources 138A and 138B. In some examples, the navigation module 122 will continue to use the electromagnetic signals 136A and 136B to determine the position and/or heading of the UAV 102 by updating its determination as the UAV 102 continues along its flight path 126. In addition, the navigation module 122 in some examples will be begin to use the electromagnetic signals 136C and 136D to supplement the position and/or heading determination based on the electromagnetic signals 136A and 136B from the respective signal sources 138A and 138B. For example, the navigation module 122 may be configured to receive location data 312 (FIG. 3) associated with the signal sources 138C and 138D, and receive the respective electromagnetic signals 136C and 136D from the signal sources 138C and 138D. The navigation module 122 may be configured to use the electromagnetic signals 136C and 136D to determine the relative orientation of the receiver 132 relative to the signal source 138C and determine the relative orientation of the receiver 132 relative to the signal source 138D. The navigation module 122 may be configured to determine the position and/or heading of the UAV 102 based at least in part on the orientations of the UAV 102 relative to the signal sources 138A, 138B, 138C, and 138D, and the respective location data 312 associated with the signal sources 138A, 138B, 138C, and 138D. In some examples, the accuracy of the determination of the positon and/or heading of the UAV 102 may be improved by using the signals from more than one pair of signal sources. In some examples, the position and/or heading may be calculated based on, for example, the averages of the positions and/or headings determined from each of two or more pairs of signal sources. Other methods for combining the position and/or heading determinations from two or more pairs of signal sources are contemplated.

As the UAV 102 travels from position $P_2$ to position $P_3$, the UAV 102 travels beyond the range of signal sources 138A and 138B, while remaining within range of signal sources 138C and 138D. The navigation module 122 may continue to use the electromagnetic signals 136C and 136D to determine the position and/or heading of the UAV 102 by updating its determination as the UAV 102 continues along its flight path 126. In addition, the navigation module 122 in some examples will be begin to use the electromagnetic signals 136E and 136F to supplement the position and/or heading determination based on the electromagnetic signals 136C and 136D from the respective signal sources 138C and 138D. For example, the navigation module 122 may be configured to receive location data 312 associated with the signal sources 138E and 138F, and receive the respective electromagnetic signals 136E and 136F from the signal sources 138E and 138F. The navigation module 122 may be configured to use the electromagnetic signals 136E and 136F to determine the relative orientation of the receiver 132 relative to the signal source 138E, and determine the relative orientation of the receiver 132 relative to the signal source 138F. At position $P_3$, the navigation module 122 may be configured to determine the position and/or heading of the UAV 102 based at least in part on the orientations of the UAV 102 relative to the signal sources 138C, 138D, 138E, and 138F, and the respective location data 312 associated with the signal sources 138C, 138D, 138E, and 138F.

In some examples, the navigation module 122 may be configured to determine the location of a signal source 138. For example, referring to FIG. 4, as the UAV 102 first comes into range of signal source 138C, so that it receives electromagnetic signals 136C, the navigation module 122 may be configured to receive signals from the signal source 138C when the UAV 102 is in a first position. For example, the first position may correspond to a position shortly after the signal source 138C comes into range and while the UAV 102 is still within range of two other signal sources 138 (e.g., signal sources 138A and 138). As the UAV 102 continues to travel along the flight path 126 within range of the signal source 138C, the navigation module 122 may be configured to receive the electromagnetic signals 136C from the signal source 138C at a second position of the UAV 102. In some examples, the navigation module 122 may be configured to determine the location of the signal source 138C based at least in part on the first and second positions of the UAV 102, which were known based on the electromagnetic signals 136A and 136B received from signal sources 138A and 138B, and the electromagnetic signals 136C received from the signal source 138C. In some examples, the position of signal source 138C may be determined by determining the relative orientation of the UAV 102 relative to the signal source 138C at the first and second locations, and thereafter determining the location by triangulation.

In some examples, one or more of the signal sources 138 may be radio stations, television stations, cellular telephone stations, mobile telephone stations, and/or Wi-Fi transmitters (e.g., amplified Wi-Fi transmitters). For example, the electromagnetic signals 136 transmitted by existing radio stations, television stations, cellular telephone stations, mobile telephone stations, and Wi-Fi transmitters may be used as the signal sources 138 for navigating the UAV 102. Thus, without the expense or inconvenience of building or deploying new signal sources, signal sources already existing in, for example, urban and suburban areas, may be leveraged to assist with navigating, or to navigate, the UAV 102 according to some examples.

Figure 5:
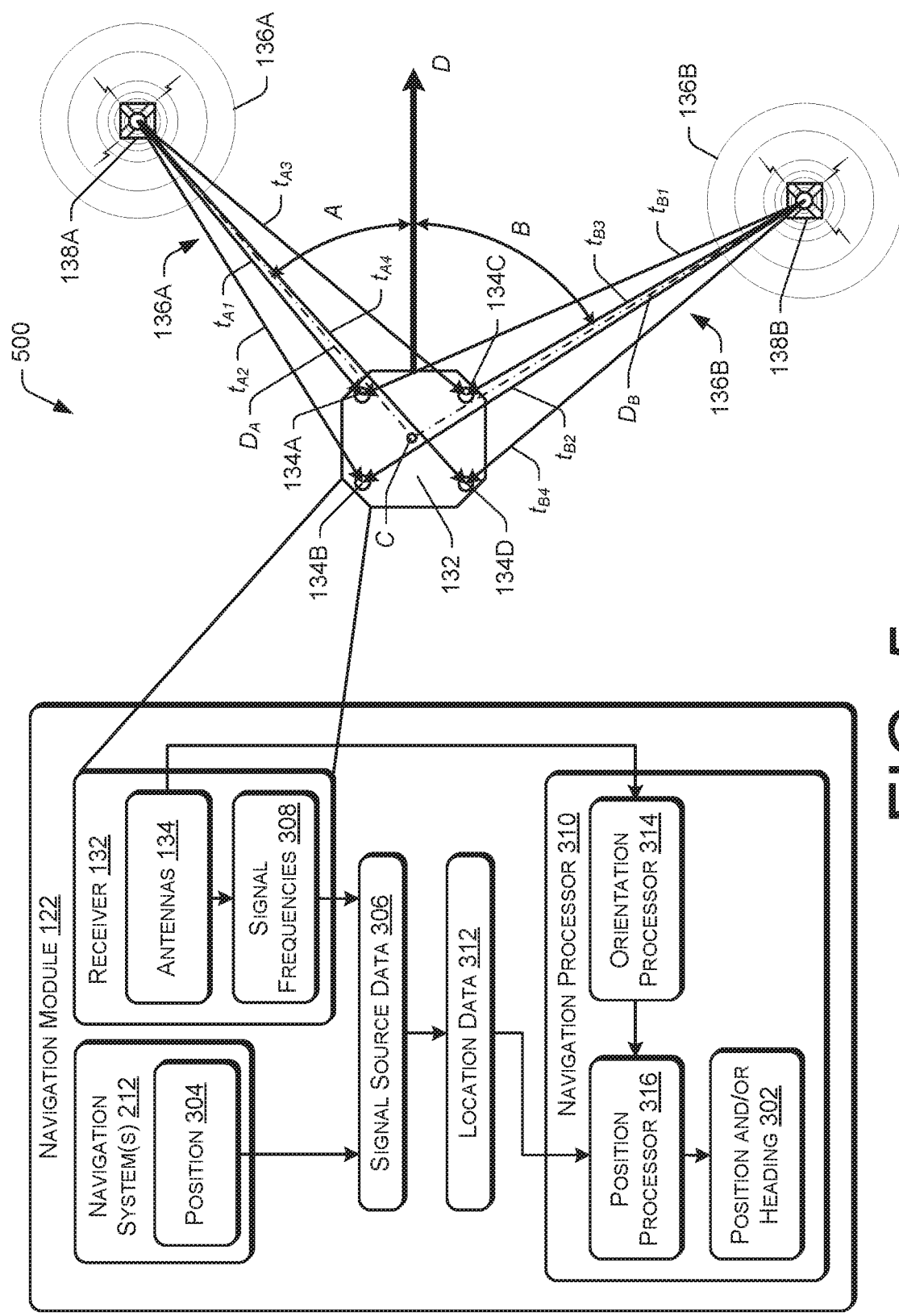
FIG. 5 is a block diagram of a portion of an illustrative UAV architecture including an illustrative receiver receiving electromagnetic signals from two signal sources and an illustrative navigation module using the electromagnetic signals for determining the position and/or heading of the receiver.

FIG. 5 is a block diagram of a portion of an illustrative UAV architecture 500 including an illustrative navigation module 122 including an illustrative receiver 132 receiving electromagnetic signals 136A and 136B from two respective signal sources 138A and 138B, and an illustrative navigation module 122 using the electromagnetic signals 136A and 136B for determining the position and/or heading 302 of the receiver 132. The receiver 132 may include two or more antennas 134. In the example shown, the receiver 132 includes four antennas 134A, 134B, 134C, and 134D spaced from one another. Because the four antennas 134A-134D are different distances from each of the signal sources 138A and 138B, each of the four antennas 134A-134D receives the electromagnetic signals 136A and 136B at slightly different times. For example, as shown, antennas 134A, 134B, 134C, and 134D receive the electromagnetic signals 136A from the signal source 138A at times $t_{A1}$, $t_{A2}$, $t_{A3}$, and $t_{A4}$, respectively, and antennas 134A, 134B, 134C, and 134D receive the electromagnetic signals 136B from the signal source 138B at times $t_{B1}$, $t_{B2}$, $t_{B3}$, and $t_{B4}$, respectively. In some examples, the orientation processor 314 may be configured to determine the angle A between the direction of travel D of the receiver 132 (and the UAV 102) and the direction $D_A$ extending between a point C associated with the receiver 132 (e.g., a central point) and the signal source 138A based on the differences between the times $t_{A1}$, $t_{A2}$, $t_{A3}$, and $t_{A4}$. In addition, the orientation processor 314 may be configured to determine the angle B between the direction of travel D of the receiver 132 and the direction $D_B$ extending between the point C to the signal source 138B based on the differences between the times $t_{B1}$, $t_{B2}$, $t_{B3}$, and $t_{B4}$.

For example, the orientation processor 314 may be configured to determine the angle A by determining the angle of the receiver 132 relative to the direction D that would result in the electromagnetic signal 136A reaching each of the antennas 134A and 134C at the same time, for example, as though the receiver 132 was heading directly toward the signal source 138A. Similarly, the orientation processor 314 may be configured to determine the angle B by determining the angle of the receiver 132 relative to the direction D that would result in the electromagnetic signal 136B reaching each of the antennas 134A and 134C at the same time, for example, as though the receiver 132 was heading directly toward the signal source 138B. Some examples of the orientation processor 314 may use a synthetic aperture focus technique to determine one or more of the angles A and B. In some examples, the orientation processor 314 may be configured to determine the angles A and B by sampling data associated with the signals 136A and 136B, buffering the data, and accessing the data to determine the angles A and B. In some examples, the sampling may be synchronized.

One or more to of the antennas 134B and 134D may be used to determine, for example, whether the signal source 138A is in front of the receiver 132 or behind the receiver 132 as the receiver 132 travels in the direction D, for example, by determining whether the time $t_{A2}$ is greater than the time $t_{A1}$, or the time $t_{A4}$ is greater than the time $t_{A3}$. If so, then the signal source 138A is in front of the receiver 132 as the receiver 132 travels in direction D. If not, then the signal source 138A is behind the receiver 132. Similarly, one or more to of the antennas 134B and 134D may be used to determine whether the signal source 138B is in front of the receiver 132 or behind the receiver 132 as the receiver 132 travels in the direction D by determining whether the time $t_{B2}$ is greater than the time $t_{B1}$, or the time $t_{B4}$ is greater than the time $t_{B3}$. If so, then the signal source 138B is in front of the receiver 132 as the receiver 132 travels in direction D. If not, then the signal source 138B is behind the receiver 132. In some examples, the receiver 132 may include only two antennas 134, and the navigation module 122 may use an alternative device or technique for determining whether the signal sources 138A and 138B are in front of the receiver 132 or behind the receiver 132 as the receiver 132 travels in the direction D.

Following determination of the angles A and B, the navigation processor 310 may determine the position and/or heading 302, for example, in a manner similar to the techniques described with respect to FIG. 3. For example, the position processor 316 may determine the position and/or heading 302 of the receiver 132 (and the UAV 102) based at least in part on the location at which virtual lines corresponding to the directions $D_A$ and $D_B$ intersect, and the respective locations of the signal sources 138A and 138B from the location data 312 associated with the signal sources 138A and 138B. By determining the orientation of the receiver 132 relative to the sources 138A and 138B and knowing the locations of the signal sources 138A and 138B, the position and/or heading 302 of the receiver 132 may be determined, for example, as explained herein.

Figure 6:
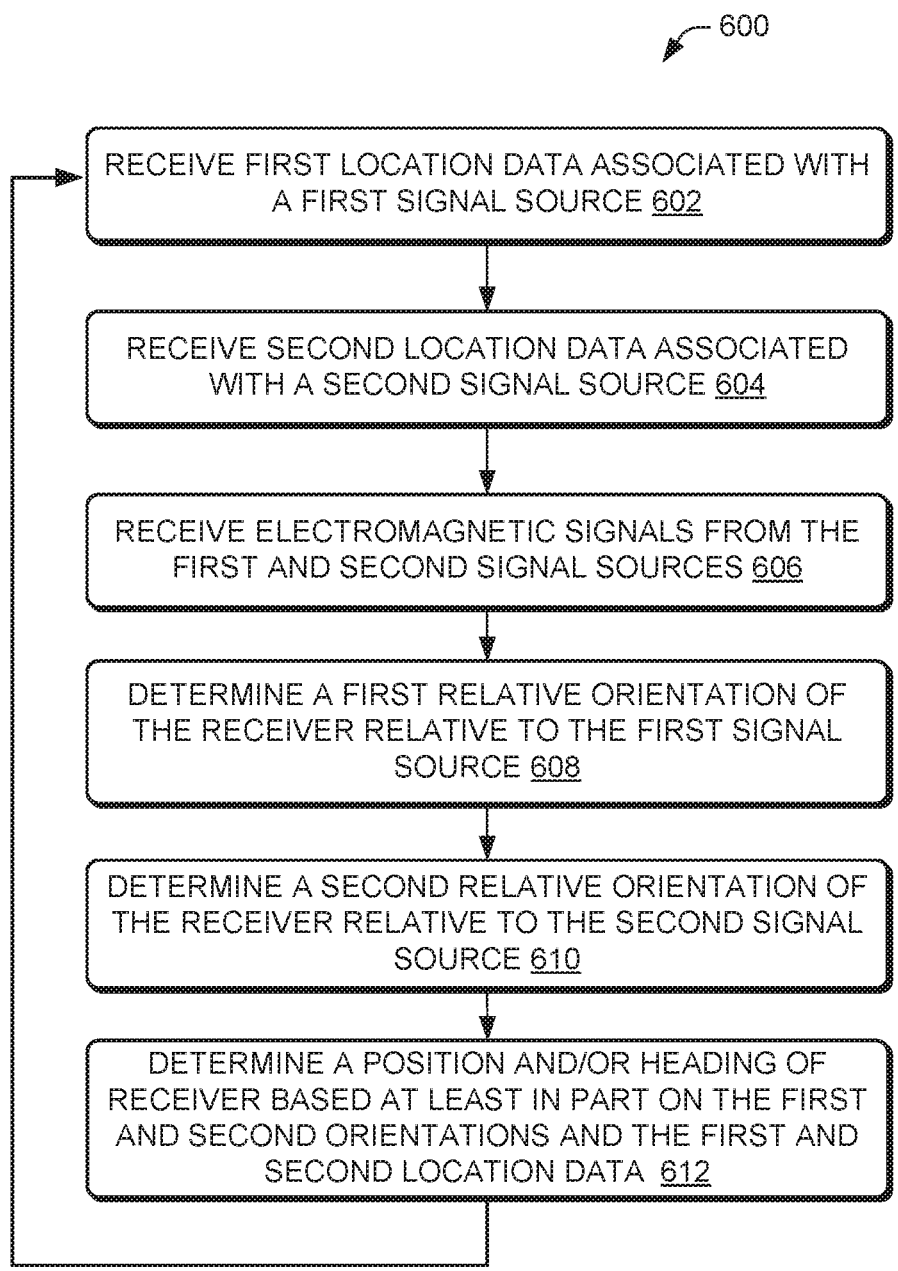
FIG. 6 is a flow diagram of an illustrative process for determining the position and/or heading of a receiver.
Figure 7:
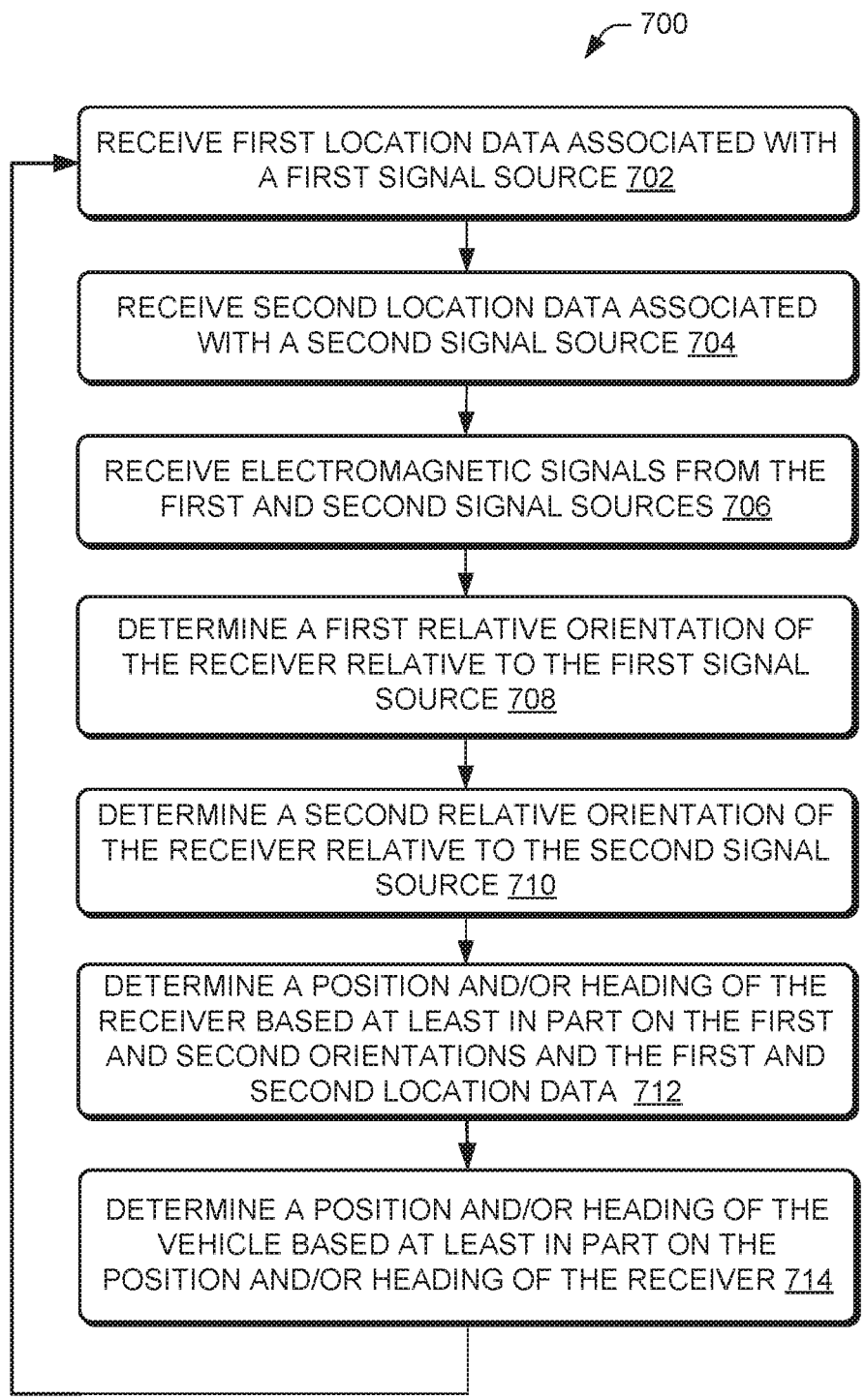
FIG. 7 is a flow diagram of an illustrative process for determining the position and/or heading of a vehicle.

FIGS. 6 and 7 are flow diagrams of illustrative processes illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

FIG. 6 is a flow diagram of an illustrative process 600 for determining the position and/or heading of a receiver using electromagnetic signals. The process 600 may be implemented in the environments 100 and 400 and by the UAV architectures 200, 300, and 500 described above, or in other environments and architectures.

In the illustrative process 600, at 602, the process 600 may include receiving first location data associated with a first signal source. For example, a navigation module may be configured to receive data including the location of the first signal source. The data may be stored in memory included in a UAV architecture or may be stored remotely and may be accessible by the navigation module via a communication network. In some examples, the data may be in the form of a table or map including data related to frequencies and locations associated with signal sources.

At 604, the process 600 may include receiving second location data associated with a second signal source. The second signal source may be spaced from the first signal source. For example, a navigation module may be configured to receive data including the location of the second signal source from either data stored in memory included in a UAV architecture or data stored remotely and accessible by the navigation module via a communication network. The signal sources may include AM and FM radio stations, and microwave transmitters. In some examples, determining at least one of the first location data or the second location data may include receiving first electromagnetic signals and/or the second electromagnetic signals, determining a frequency of the first and/or second electromagnetic signals, and determining the first and/or second location data based at least in part on the frequency. For example, determining the first and/or second location data may include receiving the first and/or second location data from a database including signal source frequencies and corresponding signal source locations. In some examples, the process 600 may include receiving third and fourth location data associated with third and fourth signal sources, respectively.

At 606, the process 600 may include receiving via a receiver including at least two antennas electromagnetic signals from the first signal source and the second signal source. For example, a navigation module may include a receiver including at least two antennas spaced from one another and configured to receive the electromagnetic signals.

The example process 600, at 608, may include determining a first relative orientation of the receiver relative to the first signal source. For example, a navigation module may include an orientation processor configured to determine the relative orientation of the receiver relative to the first signal source, for example, as described herein.

At 610, the process 600 may include determining a second relative orientation of the receiver relative to the second signal source. For example, an orientation processor may be configured to determine the relative orientation of the receiver relative to the second signal source, for example, as described herein. In some examples, the process 600 may include determining first and second virtual lines extending between the first and second signal sources, respectively, and the receiver, and determining the position of the receiver based at least in part on a location at which the first and second virtual lines intersect. In some examples of the process 600, electromagnetic signals from third and fourth signal sources may be received, and relative third and fourth orientations of the receiver relative the third and fourth signal sources, respectively, may be determined.

The process 600 may include, at 612, determining the position and/or heading of the receiver based at least in part on the first and second orientations relative to the first and second signal sources, and the first and second location data. For example, a navigation processor may include a position processor configured to determine the position and/or the heading of the receiver based at least in part on the orientations of the receiver relative to the first and second signal sources, respectively, and the locations of the first and second signal sources. In some examples, the process 600 may include determining the position and/or heading of the receiver based at least in part on the first, second, third, and fourth orientations relative to the first, second, third, and fourth signal sources, and the first, second, third, and fourth location data.

FIG. 7 is a flow diagram of an illustrative process 700 for determining the position and/or heading of a vehicle (e.g., UAV 102). The process 700 may be implemented in the environments 100 and 400 and by the UAV architectures 200, 300, and 500 described above, or in other environments and architectures.

In the illustrative process 700, at 702, the process 700 may include receiving first location data associated with a first signal source. For example, a navigation module may be configured to receive data including the location of the first signal source. The data may be stored in memory included in a UAV architecture or may be stored remotely and may be accessible by the navigation module via a communication network.

At 704, the process 700 may include receiving second location data associated with a second signal source. The second signal source may be spaced from the first signal source. For example, the navigation module may be configured to receive data including the location of the second signal source from either data stored in memory included in a UAV architecture or data stored remotely and accessible to the navigation module via a communication network. The signal sources may include AM and FM radio stations, and microwave transmitters. In some examples, determining at least one of the first location data or the second location data may include receiving first electromagnetic signals and/or the second electromagnetic signals, determining a frequency of the first and/or second electromagnetic signals, and determining the first and/or second location data based at least in part on the frequency. For example, determining the first and/or second location data may include receiving the first and/or second location data from a database including signal source frequencies and corresponding signal source locations. In some examples, the process 700 may include receiving third and fourth location data associated with third and fourth signal sources, respectively.

At 706, the process 700 may include receiving via a receiver including at least two antennas electromagnetic signals from the first signal source and the second signal source. For example, a navigation module may include a receiver including at least two antennas spaced from one another and configured to receive the electromagnetic signals.

The example process 700 may include, at 708, determining a first relative orientation of the receiver relative to the first signal source. For example, the navigation module may include an orientation processor configured to determine the relative orientation of the receiver relative to the first signal source, for example, as described herein.

At 710, the process 700 may include determining a second relative orientation of the receiver relative to the second signal source. In some examples, the process 700 may include determining first and second virtual lines extending between the first and second signal sources, respectively, and the receiver, and determining the position of the receiver based at least in part on a location at which the first and second virtual lines intersect. In some examples of the process 700, electromagnetic signals from third and fourth signal sources may be received, and relative third and fourth orientations of the receiver relative the third and fourth signal sources, respectively, may be determined.

The process 700 may include, at 712, determining the position and/or heading of the receiver based at least in part on the first and second orientations relative to the first and second signal sources, and the first and second location data. For example, the navigation processor may include a position processor configured to determine the position and/or the heading of the receiver based at least in part on the orientations of the receiver relative to the first and second signal sources, respectively, and the locations of the first and second signal sources. In some examples, the process 700 may include determining the position of the receiver based at least in part on the first, second, third, and fourth orientations relative to the first, second, third, and fourth signal sources, and the first, second, third, and fourth location data.

At 714, the process 700 may include determining the position and/or heading of a vehicle based at least in part on the position and/or heading of the receiver. For example, the receiver 132 may be coupled to the vehicle, and thus, the position and/or heading of the vehicle may be determined based at least in part on the position and/or heading of the receiver.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
    a receiver configured to be coupled to a vehicle and to receive one or more signals; and
    a navigation processor configured to:
        determine a first position of the receiver;
        identify, from stored data, one or more signal source frequencies associated with one or more signal sources within a threshold range of the first position of the receiver;
        search for the one or more signal source frequencies within the one or more signals;
        identify, among the one or more signal source frequencies, one or more first signals received from a first transmitter;
        determine, based at least in part on the one or more first signals, a first relative orientation of the receiver relative to the first transmitter;
        identify, among the one or more signal source frequencies, one or more second signals received from a second transmitter;
        determine, based at least in part on the one or more second signals, a second relative orientation of the receiver relative to the second transmitter; and
        determine a second position of the vehicle based at least in part on the first relative orientation and the second relative orientation of the receiver.

2. The system as recited in claim 1, wherein the vehicle is an unmanned aerial vehicle (UAV), and further comprising:
    memory to store instructions executable by the navigation processor to determine the position of the UAV based at least in part on the one or more first signals received from the first transmitter and the one or more second signals received from the second transmitter.

3. The system as recited in claim 1, wherein at least one of the first transmitter or the second transmitter comprises one of a radio station, a television station, a cellular telephone station, a mobile telephone station, or a Wi-Fi transmitter.

4. The system as recited in claim 1, wherein the navigation processor is further configured to determine a heading of the vehicle based at least in part on the first relative orientation, the second relative orientation, a first location of the first transmitter, and a second location of the second transmitter.

5. The system as recited in claim 1, wherein the navigation processor is further configured to:
    receive at least one of a first global positioning system (GPS) signal or a first inertial navigation system (INS) signal indicative of the first position of the vehicle from at least one of a GPS or an INS;
    determine the first position of the vehicle based on the at least one of the first GPS signal or the first INS signal indicative of the first position of the vehicle;
    determine that the at least one of the GPS or the INS is no longer providing a signal indicative of the first position of the vehicle;
    determine the second position of the vehicle based at least in part on the first relative orientation and the second relative orientation of the receiver determined based at least in part on the one or more first signals received from the first transmitter and the one or more second signals received from the second transmitter;

receive at least one of a second GPS signal or a second INS signal indicative of a third position of the vehicle from the at least one of the GPS or the INS; and determine the third position of the vehicle based on the at least one of the second GPS signal or the second INS signal indicative of the third position of the vehicle.

6. A method comprising:

determining an initial position of a receiver associated with a vehicle;

identifying, from stored data, local frequencies corresponding to signal sources within a threshold range of the initial position;

searching for one or more of the local frequencies among signals received via the receiver;

identifying, among the one or more of the local frequencies, a first signal from a first signal source and a second signal from a second signal source;

determining a first relative orientation of the receiver relative to the first signal source;

determining a second relative orientation of the receiver relative to the second signal source;

determining a first position of the receiver based at least in part on at least one of the first relative orientation or the second relative orientation; and determining at least one of a second position or a heading of the vehicle based at least in part on the first position of the receiver.

7. The method as recited in claim 6, wherein determining the first position of the receiver comprises:

determining a first virtual line extending between the first signal source and the receiver;

determining a second virtual line extending between the second signal source and the receiver; and determining the first position of the receiver based at least in part on a location at which the first virtual line and the second virtual line intersect.

8. The method as recited in claim 7, further comprising:

determining a third virtual line extending between a third signal source and the receiver;

determining a fourth virtual line extending between a fourth signal source and the receiver;

determining a second location at which the third virtual line and the fourth virtual line intersect; and determining the first position of the receiver based at least in part on the location at which the first virtual line and the second virtual line intersect and the second location at which the third virtual line and the fourth virtual line intersect.

9. The method as recited in claim 6, further comprising:

receiving at least one of the first signal or the second signal;

determining a frequency of at least one of the first signal or the second signal; and determining at least one of first location data associated with the first signal source or second location data associated with the second signal source based at least in part on the frequency.

10. The method as recited in claim 9, wherein determining at least one of the first location data or the second location data based at least in part on the frequency comprises receiving at least one of the first location data or the second location data from a database comprising signal source frequencies and corresponding signal source locations.

11. The method as recited in claim 6, further comprising:

receiving a third signal from a third signal source at a first position of the receiver;

receiving the third signal from the third signal source at a second position of the receiver; and determining a location of the third signal source based at least in part on the first position and the second position of the receiver and the third signal.

12. The method as recited in claim 11, further comprising:

determining, based at least in part on the third signal received at the first position of the receiver, a third relative orientation of the receiver relative to the third signal source;

determining, based at least in part on the third signal received at the second position of the receiver, a fourth relative orientation of the receiver relative to the third signal source; and determining the location of the third signal source based at least in part on the third relative orientation and the fourth relative orientation of the receiver.

13. The method as recited in claim 11, further comprising determining a third position of the receiver based at least in part on the third signal received from the third signal source and at least one of the first signal received from the first signal source or the second signal received from the second signal source.

14. The method as recited in claim 6, wherein at least one of the first signal source or the second signal source comprises one of a radio station, a television station, a cellular telephone station, a mobile telephone station, or a Wi-Fi transmitter.

15. The method as recited in claim 6, further comprising determining the initial position of the receiver via at least one of a global positioning system, an inertial navigation system, or an image-based navigation system, and determining the first position of the receiver based at least in part on the first relative orientation, the second relative orientation, first location data associated with the first signal source, and second location data associated with the second signal source.

16. A vehicle comprising:

a frame;

a propulsion system coupled to the frame to cause movement of the vehicle;

a receiver coupled to the vehicle and configured to receive signals; and a navigation processor configured to:

determine an initial position of the receiver;

identify, from a memory, one or more signal source frequencies associated with signal sources within a threshold range of the initial position of the receiver;

search for the one or more signal source frequencies within the signals;

identify, among the one or more signal source frequencies, a first signal received from a first signal source and a second signal received from a second signal source spaced from the first signal source;

determine a first relative orientation of the receiver relative to the first signal source;

determine a second relative orientation of the receiver relative to the second signal source; and determine at least one of a new position or a heading of the vehicle based at least in part on the first relative orientation and the second relative orientation of the receiver.

17. The vehicle as recited in claim 16, wherein the navigation processor is configured to:

determine a first virtual line extending between the first signal source and the receiver;

determine a second virtual line extending between the second signal source and the receiver; and determine at least one of the new position or the heading of the vehicle based at least in part on a second location at which the first virtual line and the second virtual line intersect.

18. The vehicle as recited in claim 17, wherein the navigation processor is configured to determine a third virtual line extending between a third signal source and the receiver, and determine at least one of the location or the heading of the vehicle based at least in part on a third location at which the first virtual line, the second virtual line, and the third virtual line intersect.

19. The vehicle as recited in claim 16, wherein at least one of the first signal source or the second signal source comprises one of a radio station, a television station, or a microwave transmitter.

20. The vehicle as recited in claim 16, wherein the vehicle is an unmanned aerial vehicle.

\* \* \* \* \*